March 17, 1970 T. S. ROBINSON 3,501,623

HIGH SPEED SKIP AND SEARCH

Filed Jan. 9, 1967 2 Sheets-Sheet 1

INVENTOR
THOMAS S. ROBINSON

BY Homer L. Knearl
AGENT

United States Patent Office 3,501,623

Patented Mar. 17, 1970

3,501,623

HIGH SPEED SKIP AND SEARCH

Thomas S. Robinson, Rochester, Minn., assignor to International Business Machines Corporation, Armonk, N.Y., a corporation of New York Filed Jan. 9, 1967, Ser. No. 608,131
Int. Cl. G08k 7/01
U.S. Cl. 235—61.11 9 Claims

ABSTRACT OF THE DISCLOSURE

A scanner of documents is controlled to operate at high speed when scanning blanks and at low speed when scanning symbols such as characters. The video signal from the scanner is monitored to detect blank spaces and characters. Blank character spaces are counted and when a given count is reached a flip-flop is set which triggers the scanner to operate at high speed. Another flip-flop in series with the first flip-flop is set when a first character is detected after a blank area. This set condition of the second flip-flop causes the scanner to change to low speed and to reverse its direction. Having been reversed in direction, the scanner backs away from the character for a given distance. The scanner is then reversed again and proceeds forward at low speed through the character so that the character may be read. A delay device and a single-shot responsive to the second flip-flop provide the second reversing signal which causes the scanner to move forward again. Therefore, the delay device defines a given time interval which corresponds to the scanner moving the given distance backwards before being reversed again to the forward direction. In addition, the above apparatus is shown operating in combination with line centering apparatus described in a copending commonly assigned patent application Ser. No. 509,512, filed Nov. 24, 1965, by Davey L. Malaby for Scan Centering Device.

BACKGROUND OF THE INVENTION

This invention relates to controlling the speed of a scanner in a machine that reads symbols and more particularly to directing the scanner to move at high speed over blank areas and at low speed over symbols to be read.

Two speed scanning in a character reader is well known. The advantage of two speed scanning is that the overall throughput of information can be increased by driving the scanner at high speed when possible. Prior to this invention the scanner has been driven at low speed over blank areas and at higher speed when scanning through characters. This rather anomalous situation is caused by two factors. First, once the scanner is on character, the speed can be set at a factor just sufficient to pick up the information necessary. The second factor is that the start of the character must be well defined. Therefore, previous to this invention the scanners had been driven at low speed high density scanning over blank areas. When the scanner first hits the character it will intersect it at very nearly the start of the character. After the start of the character is defined, the scanning speed can be stepped up to that speed which will still pick up enough information from the character to identify it. In other words the problem in prior art devices is that if they were driven at high speed over blank areas, the start of characters would not be accurately detected. By operating at high speed, the scanner could easily hit in the middle of a first character and thus the first half of the character would not be detected by the scanner.

SUMMARY OF THE INVENTION

It is an object of this invention to operate a scanner at high speed over blank areas and at low speed over characters without skipping over any portion of the first character intercepted at high speed.

It is another object of this invention to operate a scanner at high speed over blank areas, to switch the scanner to low speed when the first character after a blank area is detected and to move the scanner backwards to a position in front of the first character before moving through the character at low speed.

It is another object of this invention to operate a scanner at high speed until a character is detected and then to line center the scanner over a first group of characters detected and to move the scanner back in front of the first character of the group before proceeding at low speed through the characters.

In accordance with this invention, the objects are accomplished by driving the scanner at two or more speeds and by controlling the speed in response to the sensing of symbols so that the scanner is at high speed over blank areas and at low speed over the entire width and height of symbols to be read. A switch to high speed scanning occurs when a given amount of blank area has been detected. A switch to low speed scanning occurs when the first character is detected after a blank area. To insure that all of the first character will be scanned, the scanner is moved backwards to a position in front of the first character before proceeding through it at low speed.

As another feature of the invention, line centering or position registering apparatus is combined with the apparatus for varying the speed of the scanned. To provide sufficient scanning to accomplish line centering or position registering, the scanner is directed forwarded at low speed for a short interval after the first character is detected and then the scanner is reversed in direction to move it back to a position in front of the first character. After being positioned in front of the character the scanner is then directed at low speed through the character to obtain information for recognition purposes.

The advantage of this invention over the prior art is that it greatly increases the character throughput or document throughput in documents where there are many blank areas between blocks of characters. By using this invention the lowest scanning speed is the scanning of characters and a much higher scanning speed can be used over blank areas. Of course, in the prior art this situation was reversed. The high scanning speed was the scanning over characters and the lower scanning speed was the scanning over blank areas. The low speed scanning in this invention is equivalent to the high scanning speed in the prior art. Thus, the higher speed scanning over blank areas in this invention is many times greater than the low speed scanning over blank areas in the prior art. Another advantage of this invention is that after scanning over blank areas at high speed the apparatus can position register itself on the first character after the blank area.

The foregoing and other objects, features and advantages of the invention will be apparent from the following more particular description of preferred embodiments of the invention, as illustrated in the accompanying drawings.

DESCRIPTION

Figure 1:
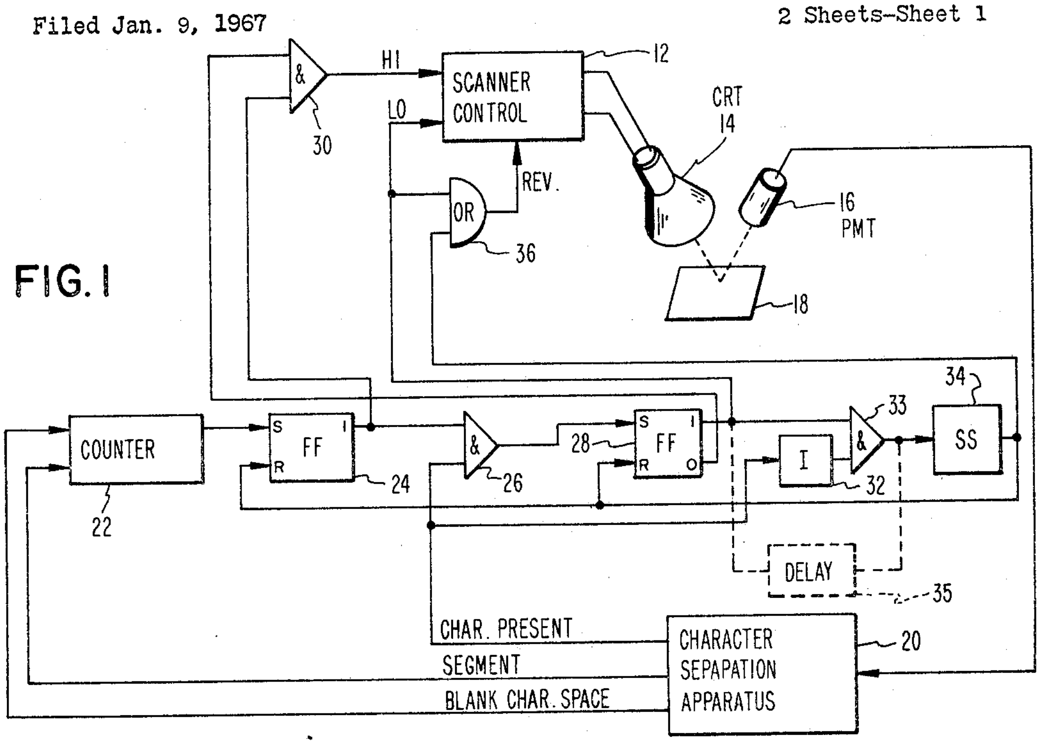
FIG. 1 shows a logic block diagram for the preferred embodiment of the invention.

Referring now to FIG. 1, the scanner being controlled by the invention is sown as scanner control 12, cathode ray tube 14 and photomultiplier tube 16. The function of the scanner control 12 is to control the speed and direction of the beam in cathode ray tube 14. The purpose of the photomultiplier tube 16 is to pick up reflected light from the document 18. The intensity of the reflected light varies in accordance with whether the scanning beam is passing over white area or intersecting dark symbols such as marks, characters or numerals. The video signal from the photomultiplier tube is passed to the character separation apparatus 20.

The purpose of the character separation apparatus 20 is to detect when the video signal contains character information, when the video signal represents a character blank space and when the video signal represents the end of a character. The end of character condition is referred to as segment or segmentation. The purpose of the segmentation signal is to separate adjacent character information in the video signal. These three signals, character present, segment and blank character space are used in the invention. The generation of these signals is described in detail in copending patent application, Ser. No. 504,-457, filed Oct. 24, 1965, and assigned to the same assignee.

As pointed out previously, the purpose of the invention is to increase document throughput through character readers by having the scanner move at high speed over blank areas on the document. To detect a blank area counter 22 counts the blank spaces detected by character separation apparatus 20. Counter 22 is reset to 0 by the segment signal from character separation apparatus 20. This segment signal indicates the separation apparatus has detected a character. Therefore counter 22 counts consecutive blank character spaces. When counter 22 reaches a given count, it generates an output pulse which sets flip-flop 24.

The purpose of flip-flop 24 is to indicate when the scanner is crossing blank area. AND gate 26 and a flip-flop 28 are serially connected to the set side of flip-flop 24. Accordingly, AND gate 26 is conditioned to pass its other input signal when flip-flop 24 indicates a blank area. The other signal passed by AND gate 26 is a character present signal from character separation apparatus 20. If the character present signal occurs when AND gate 26 is conditioned, flip-flop 28 is set. Accordingly, flip-flop 28 becomes set when the first character is detected by the separation apparatus after a blank area. Flip-flops 24 and 28 cooperate to control the speed of the scanner by acting on scanner control 12 directly or through AND gate 30.

To signal the scanner to operate at high speed AND gate 30 must have concurrent outputs of the set side of flip-flop 24 and the reset side of flip-flop 28. These concurrent signals will be present when counter 22 signals that the scanner is over a blank area. On the other hand to switch the scanner to low speed, the set side of flip-flop 28 is applied directly to the scanner control 12. Therefore, the scanner will be switched to low speed as soon as the first character after a blank area is intercepted by the scanner.

To insure full scanning of the first character, inverter 32, AND gate 33 and single-shot 34 are provided. The first character present indication from flip-flop 28 is passed through OR gate 36 and signals the scanner control 12 to reverse the direction of the scanner. The scanner will then move backwards until another reverse signal is received from single-shot 34 via OR gate 36. The distance of backward movement is controlled by AND gate 33. AND gate 33 has an output signal when the scanner has moved backwards off the character intersected at high speed. When the character was intersected, flip-flop 28 was set and thereby conditioned AND gate 33 to pass its other input signal. The other input signal is from inverter

32 and is indicative of no character present. The no character present signal will occur when the scanner has backed off the character intersected at high speed. Therefore as soon as the scanner has moved back in front of the character, AND gate 33 triggers single-shot 34. Single-shot 34 in turn signals the scanner control 12 to reverse scanner direction, and the scanner again moves forward to scan the character at low speed.

Alternatively, AND gate 33 and inverter 32 could be replaced by delay 35 (shown by dashes in FIG. 1). Delay 35 should be sufficient to insure that the backward movement of the scanner will position the scanner in front of the first character before single-shot 34 signals the scanner to reverse again and move to the forward direction.

The signal from single-shot 34 is also used to reset flip-flops 24 and 28 so that the system will be prepared to detect the next blank area and switch to high speed scanning.

OPERATION

Figure 2A:
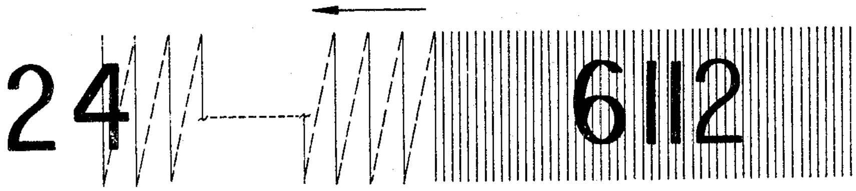
FIGS. 2*a*, 2*b* and 2*c* show the scanning pattern developed by the embodiment of the invention in FIG. 1.
Figure 2B:
Figure 2C:

As an example of operation, reference is now made to FIGS. 2*a*, 2*b* and 2*c* in conjunction with FIG. 1. As shown in FIG. 2, it is assumed that the scanner is making a raster scan pattern by moving vertically through characters and being incremented in a forward direction from right to left. Furthermore, to start the example it is assumed that the scanner has been scanning characters, that the scanner is presently scanning the character 6 in FIG. 2*a* and that flip-flops 24 and 28 in FIG. 1 are reset.

As the scanner beam moves left off of the numeral 6 in FIG. 2*a*, the character separation apparatus indicates blank character spaces. When counter 22 has counted two blank character spaces it generates an output pulse which sets flip-flop 24. The set output of flip-flop 24 is passed by AND gate 30 to scanner control 12 to switch the scanner into high speed scanning. AND gate 30 is conditioned to pass the signal from flip-flop 24 because flip-flop 28 is reset. The change to high speed scanning in the scanner control is accomplished by increasing the horizontal incremental shifts in the scanning by a factor of four.

As the raster scan pattern proceeds at high speed from right to left, the next character intersected in FIG. 2*a* is the numeral 4. During the scan that first hits numeral 4, the character separation apparatus 20 generates a character present signal. Because flip-flop 24 has been set by the blank area this character present signal is passed by AND gate 26 to set flip-flop 28. Flip-flop 28 then has an output from its set terminal indicating characters are present. This output from the set terminal of flip-flop 28 directs the scanner control to move the scanner at low speed and to reverse the horizontal direction of scanning.

As shown in FIG. 2*b*, the raster scan pattern after hitting the numeral 4 is switched to low speed (short horizontal displacement between scans) and reversed in direction so that the pattern moves from left to right. The distance that the raster scan pattern moves backwards is controlled by AND gate 33. When the character present signal drops out, AND gate 33 triggers the single-shot 34. Single-shot 34 then signals the scanner control to reverse the direction of the scanner. After single-shot 34 has fired, the scanner moves forward (right to left) at slow speed through the characters as shown in FIG. 2*c*.

As an alternative to AND gate 33 and inverter 32, delay 35 could control the amount of backward movement. The delay must be sufficient to permit the scanner to move back in front of the first character so that during low speed scanning in the forward direction the entire character will be scanned. Therefore, in the raster scan pattern shown in FIG. 2, the amount of delay is dependent upon the width of the character and the horizontal displacement between scans at high speed. Specifically, for FIG. 2 as shown in the example of the numeral 4, the high speed scan may first intercept the numeral 4 about half way through the character. Therefore, the delay provided by delay 35 must be sufficient to allow the scanner to move backwards a distance slightly greater than half the width of the character. Of course it will be appreciated by one skilled in the art that the amount of delay required for backward movement will vary according to the scan pattern used and its movement relative to the character being scanned.

HIGH SPEED SKIP AND LINE CENTERING

As another feature of the invention, the high speed skip is combined with line centering apparatus. As an example, the embodiment of the invention shown in FIG. 1 is combined with line centering apparatus described in copending patent application Ser. No. 509,512, filed Nov. 24, 1965 and assigned to the same assignee.

As described in copending patent application 509,512 the line centering apparatus has four modes of operation. In mode 0, the line centering apparatus directs the scanner to move from left to right at high speed. When the apparatus detects that the scanner has intercepted a character, the line centering apparatus switches to mode 1. In mode 1, the scanner is switched to low speed and a line centering correction is made during each scan. After a given number of scans in mode 1, the centering apparatus switches to mode 2. In mode 2, the line centering apparatus directs the scanner to move at high speed and line centering correction is made every seventh scan. The line centering apparatus continues to operate in mode 2 until the righthand margin of the document is detected. When the righthand margin is detected, a character recognition scan (CHAR REC SCAN) signal is generated and causes the centering apparatus to switch to mode 3. In mode 3 the centering apparatus directs the scanner to reverse its direction and move at low speed. The scanner then moves from right to left at low speed reading the characters upon which the scanner has just been line centered. During mode 3 the line centering apparatus makes minor corrections to centering during the scans which occur between characters.

The embodiment of the high speed skip shown in FIG. 1 can readily adapted to cause the scanner to skip blank areas as it moves from right to left reading the characters.

Figure 3:
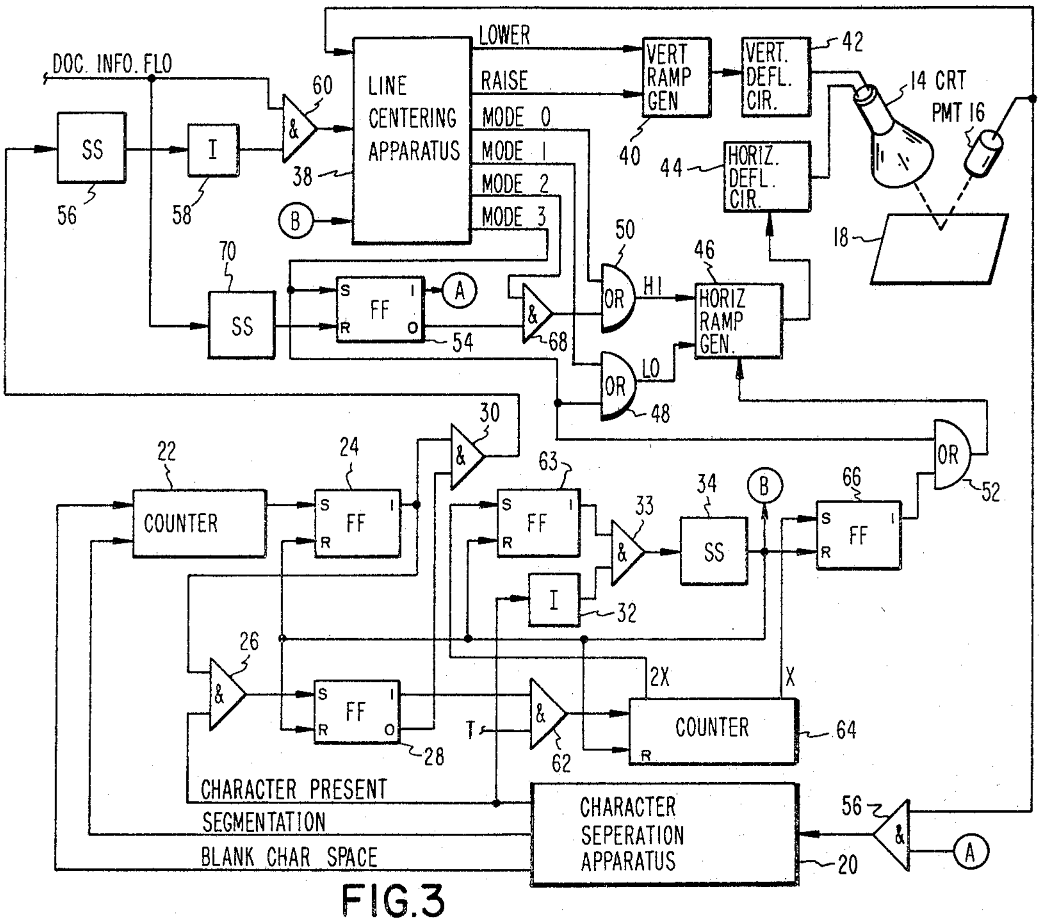
FIG. 3 shows an application of the invention wherein the invention is operated in conjunction with line centering apparatus.

Now referring to FIG. 3 the line centering apparatus 38 is shown in combination with logic to develop the control signals for high speed skip. The line centering apparatus 38 receives the video signal from PMT 16 and begins operation in mode 0 as described in the copending application 509,512. The line centering apparatus provides lower or raise signals to the vertical ramp generator 40. The vertical ramp generator then generates positive/negative signals for the vertical deflection circuits 42 which act to direct the scanning beam in the cathode ray tube 14. The lower or raise signal from the line centering apparatus 38 are the correction signals which center the scanner on a line of characters.

The line centering apparatus 38 also provides output signals, mode 0, mode 1, mode 2 and mode 3 which are used to control the horizontal speed and direction of the scanner. Horizontal deflection of the scanner in the cathode ray tube 14 occurs in response to a signal from the horizontal deflection circuit 44. The deflection circuit 44 in turn receives its deflection signals from horizontal ramp generator 46. From the line centering apparatus 38 the mode 1 and mode 2 signals are passed via OR gate 48 to the horizontal ramp generator 46. These mode 0 and mode 2 signals cause the horizontal ramp generator to provide a large displacement signal to the horizontal deflection circuits 44. Accordingly, a signal passed by OR gote 48 directs the scanner to move at high speed. Mode 1 and mode 3 signals from line centering apparatus 38 are passed by OR gate 50 to the horizontal ramp generator 46. In response to a mode 1 or a mode 3 signal the horizontal ramp generator 46 provides a small horizontal displacement signal to the horizontal deflection circuits 44. Accordingly, a signal from OR gate 50 causes the scanner to move at low speed. The mode 3 signal from the line centering apparatus in addition to signalling a change to low speed is also passed by OR gate 52 to cause the horizontal ramp generator 46 to reverse the horizontal direction of motion of the scanner.

To initialize High Speed Skip, flip-flop 54 is set when mode 3 comes up for the first time. This condition occurs when the scanner is at the righthand margin and is about to proceed left to make the recognition scans. The set condition of flip-flop 54 is used to condition AND gate 56 to pass the video signal from PMT 16 to the character separation apparatus 20. The character separation apparatus 20 then acts in conjunction with counter 22, flip-flop 24 and flip-flop 28 to indicate a blank area and the first character after a blank area. Logic blocks in FIG. 3 identical to logic blocks in FIG. 1 have been given the same reference number.

When flip-flop 24 is set indicating a blank character area, the set condition is passed by AND gate 30 (as previously discussed in FIG. 1) and triggers single-shot 56. The purpose of single-shot 56 and inverter 58 is to inhibit AND gate 60 for a short interval. This effectively blanks out the document information field (DOC INFO FLD) signal for a short interval. When the document information field signal is again passed by AND gate 60, the line centering apparatus switches to mode 0 operation. As discussed in copending application 509,512, the document information field signal coming up triggers the line centering apparatus 38 into mode 0 operation.

As the line centering apparatus 38 is now in mode 0, the scanner will be driven at high speed until the line centering apparatus detects the presence of a character. When the scanner intercepts the first character, the line centering apparatus switches to mode 1 which causes the line centering procedure to begin and switches the scanner to low speed.

Simultaneous with the switch from mode 0 to mode 1 in the line centering apparatus 38, the character separation apparatus generates a character present signal indicating the first character has been detected. The character present signal is passed by AND gate 26 to set flip-flop 28 which in turn conditions AND gate 62 to pass signals to counter 64. AND gate 62 passes a timing signal to coutner 64. The timing signal T occurs once during each vertical scan so that counter 64 is advanced one count for each vertical scan.

The purpose of counter 64 is to act as a delay device controlling the forward and backward motion of the scanner as it moves from right to left. The first signal out of counter 64 occurs when the counter reaches a given count X. This signal is used to set flip-flop 66. The set condition from flip-flop 66 is passed by OR gate 52 to the horizontal ramp generator 46 to reverse the horizontal direction of motion of the scanner. In effect, the X count defines the number of scans that the scanner is allowed to go forward after the first character following a blank area is detected. When X number of scans have been counted after the first character is detected, the scanner is reversed in direction so that it will return to a position in front of the first character before making the recognition scans.

The purpose of allowing the scanner to proceed forward for X scans after striking the first character following blanks instead of immediately reversing the scanner is that this forward scanning permits the line centering apparatus 38 to again center the scanner on the characters. After the scanner is reversed in direction, the counter 64 continues to count the number of scans. When a count of 2X is reached, the counter 64 generates an output signal which sets flip-flop 63. Flip-flop 63 conditions AND gate 33 to pass the no character present signal from inverter 32. The no character present signal comes up as soon as the scanner has moved back off of the first character detected during high speed scanning.

AND gate 33 then triggers single-shot 34. The output from single-shot 34 resets flip-flops 24, 28, 63 and 66 and counter 64. Also, the output from single-shot 34 will be OR'd with the CHAR REC SCAN signal shown in FIG. 8 of copending application 509,512. The signal from such an OR gate will cause the line centering apparatus 38 to switch into mode 3. As previously stated in mode 3 the line centering apparatus reverses the direction of the scanner, and the scanner moves forward from right to left to make the recognition scans.

The count 2X signal, which sets flip-flop 63, comes up when the scanner is located back at the scan position where it first intersected the first character during high speed scanning. From this scan position on, the inverter 32, AND gate 33 and single-shot 34 function just as they did in FIG. 1. To review, AND gate 33 triggers single-shot 4 when the scanner has just moved back in front of the first character. The output from single-shot 34 causes the scanner to reverse its direction and move forward through the characters at low speed. In FIG. 3, this is accomplished by having single-shot 34 switch the line centering apparatus 38 into mode 3 operation.

Simultaneous with the counter counting the X and 2X number of scans, the line centering apparatus is operating first in mode 1 and then in mode 2. Because normally a mode 2 signal causes the scanner to switch to high speed, the mode 2 signal out of the line centering apparatus 38 must be inhibited from getting to the horizontal ramp generator 46.

To inhibit the mode 2 signal during high speed skip, the reset condition from flip-flop 54 is applied to AND gate 68. Flip-flop 54 is in a set condition during high speed skip; therefore, its reset terminal will be down during high speed skip and this condition can be used to inhibit AND gate 68 from passing the mode 2 signal to OR gate 48. After a line of characters have been completely scanned, the DOC INFO FLD signal will drop out and only come up again at the start of the next line. When the signal again comes up, it triggers single-shot 70 which resets flip-flop 54. AND gate 68 is then conditioned to pass the mode 2 signal during the left to right scan of the next line when high speed skip is not in operation.

OPERATION OF HIGH SPEED SKIP AND LINE CENTERING

Figure 4:
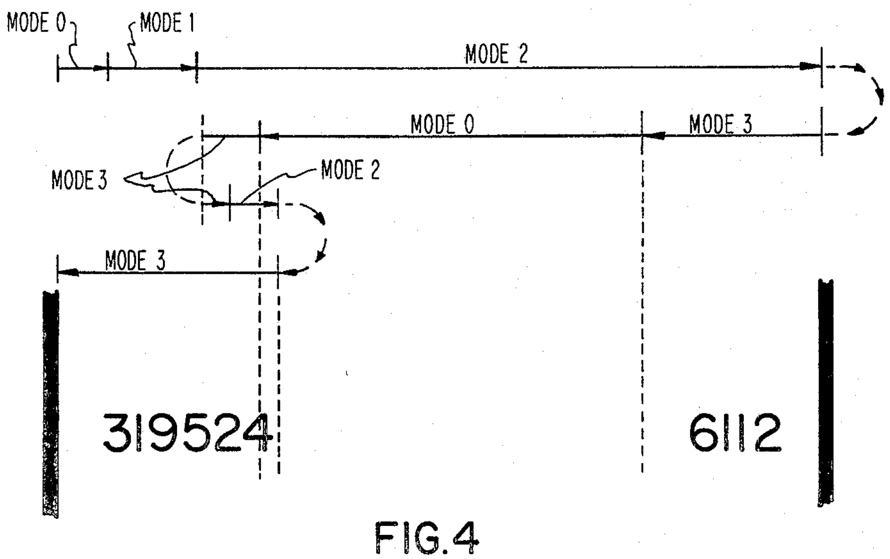
FIG. 4 shows the modes of scanning used by the invention when operating in combination with a line centering apparatus as shown in FIG. 3.

To review the combined cooperation of high speed skip and line centering, the scanner will be directed across a line of characters shown in FIG. 4. Initially the scanner is positioned at the left-hand side and the line centering apparatus is in mode 0. In mode 0 operation the scanner is directed to move at high speed until it hits the first character—the numeral 3 in this example. The line centering apparatus then switches to mode 1 operation and begins centering the scanner on the line of characters. After the scanner intersects the numeral 3, the line centering apparatus 38 maintains operation in mode 1 for a given distance and then switches to mode 2 operation. In mode 2 operation the line centering is continued, but the scanner is directed at high speed and moves rapidly to the right-hand margin. At the right-hand margin the line centering apparatus 38 responds to the field bar and switches to mode 3 operation. As previously pointed out, when there is a switch to mode 3 operation the scanner reverses in direction. Also during mode 3 the scanner is directed to move at low speed. The mode 3 signal from line centering apparatus 38 also sets flip-flop 54 which via AND gate 56 initiates the operation of high speed skip.

Before the counter 22 has counted enough blank characters to signal a change to high speed the scanner intercepts the numeral 2 on the right-hand side. The scanner then proceeds to read the numerals 2, 1, 1, 6 (reading from right to left) and then proceeds at low speed out into the blank area. After the counter 22 has counted a given number of blank character spaces (for example, two blank character spaces) the flip-flop 24 is set and the line centering apparatus is switched into mode 0 operation by the signal passing from flip-flop 24 through AND gate 30, single-shot 56, inverter 58 and AND gate 60.

Being now in mode 0 operation the line centering apparatus 38 directs the scanner at high speed until the scanner hits the numeral 4 at the left-hand side of the document. When the numeral 4 is intercepted, the line centering apparatus switches into mode 1 operation. Also flip-flop 28 is set by character separation apparatus 20. As the scanner proceeds at slow speed (being in mode 1) to the left, counter 64 is counting the number of scans since the numeral 4 was detected. After X scans are counted, counter 64 supplies a signal which sets flip-flop 66 whose set condition in turn signals the horizontal ramp generator 46 to reverse the direction of horizontal scan. Meanwhile, the line centering apparatus is performing its centering function first in mode 1 and then in mode 2 except that the mode 2 change to high speed is inhibited by flip-flop 54.

Eventually, the counter 64 has counted to 2X scans indicating the scanner has moved back to the scan position where it first hit the numeral 4. The count 2X signal sets flip-flop 63 which conditions AND gate 33. The scanner moves onto the right, and when it no longer scans through the numeral 4, the no character present signal is passed by AND gate 33 to trigger single-shot 34. The output from single-shot 34 signals the line centering apparatus 38 to switch to mode 3 operation. In mode 3 operation the line centering apparatus signals the horizontal ramp generator 46 to reverse direction and the scanner again moves at low speed from right to left so as to read the numerals 4, 2, 5, 9, 1, 3. The output from the single-shot 34 is also used to reset the high speed skip circuitry—flip-flops 24, 28, 63 and 66 and counter 64.

After the scanner has moved to the right of the numeral 3, counter 22 again counts the blank character spaces. However, before enough blank characters are counted to activate the high speed skip, the scanner reaches the left-hand margin and the scanner is moved to the next line to start operation again in mode 0. As the scanner moves to the next line, the DOC INFO FLD signal drops out and then comes on again at the start of the next line and thereby resets flip-flop 54. The high speed skip apparatus is then inhibited from operation until the next mode 3 signal is generated by the line centering apparatus 38.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Apparatus for varying the speed of a scanner which scans symbols comprising:

means for driving the scanner at higher speed during scanning of blank areas and at lower speed during scanning of symbols;

means for controlling the speed of said drive means in response to the scanner sensing the presence of symbols so that the scanner is driven at higher speed during scanning of blanks and at lower speed during scanning of symbols;

means for temporarily reversing the drive applied to the scanner by said driving means after the presence of a first symbol is sensed by the scanner during the higher speed scanning so that when switching to the lower speed for scanning the symbol the scanner temporarily moves backward to a position in front of the symbol before scanning through the symbol at the lower speed.

2. Apparatus for varying the speed of a scanner comprising the apparatus of claim 1 and in addition:

means for permitting forward motion of the scanner for a given interval after the first symbol is sensed and before said reversing means temporarily reverses the drive, the interbal being sufficient to permit the scanner to position register itself on the symbols.

3. The apparatus of claim 1 wherein said reversing means comprises:

first signaling means for signaling said driving means to reverse the drive applied to the scan, when a first symbol after a blank area is sensed by the scanner, so that when switching to the lower speed for scanning symbols the scanner moves backward off of the first symbol;

second signaling means for signaling said driving means to reverse the drive a second time after the scanner has moved back in front of the first symbol so that the scanner then moves forward through the symbols at the lower speed.

4. The apparatus of claim 3 wherein said second signaling means comprises:

detecting means enabled by said first signaling means for detecting when the scanner is no longer scanning through the first symbol but instead is in front of the first symbol;

means responsive to said detecting means for commanding said driving means to reverse the drive applied to the scanner so that when said detecting means detects that the scanner is in front of the first symbol, the scanner moves forward through the symbols at the lower speed.

5. The apparatus of claim 3 wherein said second signaling means comprises:

delaying means responsibe to said first signaling means for generating a delayed signal a predetermined interval after said first signaling means has signaled said driving means to reverse the scanner drive, the predetermined interval being sufficient to permit the scanner to move back in front of the first symbol;

means responsive to the delayed signal for directing said driving means to reverse the drive applied to the scanner so that after the scanner has moved back in front of the first symbol, the scanner moves forward through the symbols at the lower speed.

6. Apparatus for changing the speed of a scanner comprising:

means for driving the scanner in a forward or backward direction at high or low speed relative to the media being scanned;

first means for detecting when the scanner is scanning through symbols;

second means for detecting when the scanner is scanning through a blank area;

first generating means for generating a first switching signal to switch said driving means to high forward speed when said second detecting means indicates a blank area is being scanned;

second generating means responsive to said first detecting means and enabled by the first switching signal for generating a second switching signal to switch said driving means to low backward speed when said scanner intersects the first symbol after a blank area;

third generating means enabled by the second switching signal from said second generating means for generating a switching signal to switch said driving means to low forward speed after the scanner is back in front of the first symbol after a blank area.

7. Apparatus of claim 6 wherein said third generating means comprises:

third detecting means enabled by the switching signal from said second generating means for detecting when the scanner is no longer scanning through the first symbol and is back in front of the first symbol;

means for signaling said driving means to switch to low forward speed when said third detecting means detects that the scanner is back in front of the first symbol.

8. Apparatus of claim 6 wherein said third generating means comprises:

delaying means responsive to the second switching signal sent to said driving means for providing a delayed signal, the interval of delay being sufficient to allow the scanner to move backward to a position in front of the first symbol;

means responsive to the delayed signal for signaling said driving means to switch to low forward speed when the scanner is back in front of the first symbol.

9. Apparatus for changing the speed of a scanner comprising:

means for driving the scanner in a forward or backward direction at high or low speed relative to the media being scanned;

first means for detecting when the scanner is scanning through symbols;

second means for detecting when the scanner is scanning through a blank area;

first generating means for generating a first switching signal to switch said driving means to high forward speed when said second detecting means indicates a blank area is being scanned;

second generating means responsive to said first detecting means and enabled by the first switching signal for generating a second switching signal to switch said driving means to low forward speed when said scanner intersects the first symbol after a blank area;

means for centering the scanner on the symbol being scanned;

third generating means enabled by the second switching signal for generating a third switching signal to switch said driving means to low backward speed after the scanner has moved forward a sufficient distance to permit said centering means to center the scanner on the symbol;

fourth generating means enabled by the third generating signal for generating a switching signal to switch said driving means to low forward speed after the scanner is back in front of the first symbol after a blank area.

References Cited

UNITED STATES PATENTS

| | | | |
|---|---|---|---|
| 2,904,777 | 9/1959 | Cox | 340—174.1 |
| 3,025,740 | 3/1962 | Sorkin. | |
| 3,240,872 | 3/1966 | Relis et al. | 178—7.2 |
| 3,273,123 | 9/1966 | Lowitz | 340—146.3 |
| 3,322,961 | 5/1967 | Harrison. | |
| 3,328,788 | 6/1967 | Taris | 340—174.1 |
| 3,440,630 | 4/1969 | Niquette | 340—174.1 |
| 3,208,041 | 9/1965 | Swenson | 340—147 |

DARYL W. COOK, Primary Examiner

R. M. KILGORE, Assistant Examiner

U.S. Cl. X.R.

250—219; 340—146.3, 174.1